(12) United States Patent
Silveston et al.

(10) Patent No.: US 6,521,200 B1
(45) Date of Patent: Feb. 18, 2003

(54) CATALYST AND PROCESS FOR OXIDATION OF SULPHUR DIOXIDE

(75) Inventors: Peter Lewis Silveston, Charleston, SC (US); Robert Ross Hudgins, Waterloo (CA); Radu Valentin Vladea, Kitchener (CA)

(73) Assignee: University of Waterloo, Waterloo (CA)

( * ) Notice: Subject to any disclaimer, the term of this patent is extended or adjusted under 35 U.S.C. 154(b) by 0 days.

(21) Appl. No.: 09/674,907

(22) PCT Filed: May 13, 1999

(86) PCT No.: PCT/CA99/00434

§ 371 (c)(1),
(2), (4) Date: Nov. 7, 2000

(87) PCT Pub. No.: WO99/59915

PCT Pub. Date: Nov. 25, 1999

(30) Foreign Application Priority Data

May 14, 1998 (CA) .............................................. 2237744

(51) Int. Cl.⁷ .............................................. C01B 17/69
(52) U.S. Cl. .............................. 423/512.1; 423/244.01; 423/244.03; 423/521; 423/522; 423/533; 423/544; 502/180; 502/416; 502/417; 502/517; 502/527.2; 502/527.22; 502/527.23
(58) Field of Search ................................. 423/549, 533, 423/244.03, 244.01, 522, 521, 512.1, 544; 502/180, 416, 417, 517, 527.2, 527.22, 527.23

(56) References Cited

U.S. PATENT DOCUMENTS

| 3,440,007 | A | * | 4/1969 | Takeuchi | ..................... 23/119 |
|---|---|---|---|---|---|
| 3,544,263 | A | * | 12/1970 | Ninomiya et al. | ................ 23/2 |
| 3,634,028 | A | * | 1/1972 | Hohne | ........................... 23/2 S |
| 3,769,144 | A | * | 10/1973 | Economy et al. | .............. 161/50 |
| 3,907,970 | A | * | 9/1975 | Boening | ..................... 423/242 |
| 4,250,151 | A | * | 2/1981 | Johnson | ...................... 423/230 |
| 5,482,906 | A | * | 1/1996 | Sakai et al. | ................. 502/402 |

FOREIGN PATENT DOCUMENTS

| CA | 1299843 | 5/1992 | ............. B01J/8/02 |
|---|---|---|---|
| DE | 28 11 646 A1 | * 9/1979 | |
| DE | 38 26 372 A1 | * 2/1990 | |
| JP | 49 45157 B | * 12/1974 | ........... 423/244.03 |
| JP | 50-17316 B | * 6/1975 | |

OTHER PUBLICATIONS

Derwent Abstract for JP 50017316 B (Jun. 19, 1975).*
Derwent Abstract for JP 49043469 B (Nov. 21, 1974).*

* cited by examiner

Primary Examiner—Stanley S. Silverman
Assistant Examiner—Timothy C. Vanoy
(74) Attorney, Agent, or Firm—Libert & Associates; Victor E. Libert

(57) ABSTRACT

A process for the recovery of sulphur trioxide, solutions of sulphuric acid, or organic derivatives thereof, using organic compounds and/or supercritical fluids, and catalyst. The process comprises the steps of passing a mixture of $SO_2$ and an oxygen-containing gas over an activated carbon catalyst at a temperature of at least 15° C. and preferably at a pressure of 1–200 atmospheres, and stripping the activated carbon with either (i) a liquid organic compound selected from the group consisting of ketones, ethers, decalin, tetrahydrofurans, sulpholanes, glymes and formamides and which is non-reactive with sulphur trioxide or sulphuric acid, or (ii) a liquid organic compound capable of forming organic sulphates or sulphonates by reaction with sulphur trioxide or sulphuric acid. The process may be used to obtain sulphuric acid, or organic sulphates or sulphonates.

23 Claims, 2 Drawing Sheets

CATALYST AND PROCESS FOR OXIDATION OF SULPHUR DIOXIDE

Figure 1:
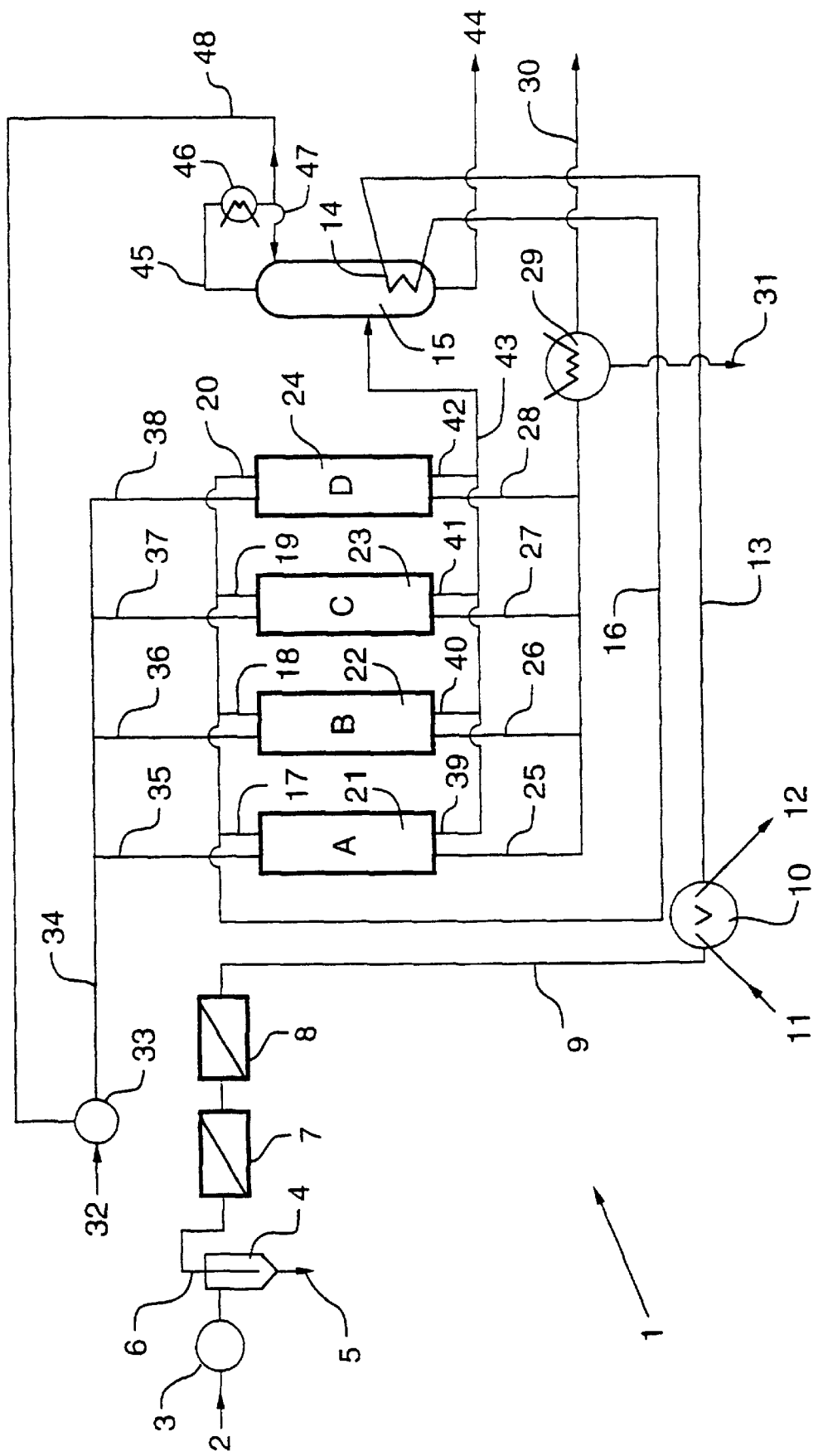

The present invention relates to a catalyst and process for the oxidation of sulphur dioxide by air or oxygen-containing gases and to the recovery of the oxidation products thereof. In particular, the present invention relates to a catalyst and process for oxidation of sulphur dioxide at low temperatures in the presence of a catalyst and the recovery of oxidation products as sulphuric acid, or as reaction products of sulphur trioxide or sulphuric acid with organic compounds. In preferred embodiments, the present invention relates to the oxidation of sulphur dioxide from a source having a concentration of sulphur dioxide of between 0.01 and 15 vol. % $SO_2$. Examples of such sources are flue gas, tail gases from sulphuric acid plants and off-gas from smelters. In addition, the sulphur dioxide may be obtained in plants for the manufacture of sulphuric acid or sulphur trioxide.

Sulphuric acid is the world's most common industrial chemical. It is normally manufactured by either a) burning sulphur to form sulphur dioxide and converting the sulphur dioxide to sulphur trioxide over a multistage packed bed reactor using promoted vanadium pentoxide as catalyst, or b) oxidation of sulphur dioxide from waste gases in the same manner.

Oxidation of sulphur dioxide is a highly exothermic reaction, and the currently preferred catalysts are active only at high temperatures e.g. about 450–550° C. The preferred catalysts are a eutectic mixture of vanadium pentoxide and potassium pyrosulphate supported on titanium dioxide, alumina, silica or minerals such as kieselguhr. Since the reaction is reversible and exothermic, the reactor usually consists of four trays in series that are operated adiabatically, in order to enhance the overall conversion. The reacting gas is always cooled before the last trays, and sometimes also after the intermediate trays. The catalyst layers are typically from about 15 to 50 cm deep, and consequently the cost of the catalyst is a large portion of the cost of the loaded reactor. For example, a plant that produces 1,000 tonnes of acid per day may contain 150,000 to 200,000 liters of catalyst.

The sulphur trioxide formed is dissolved in 98% sulphuric acid. If attempts are made to dissolve $SO_3$ directly into water or into a weaker acid, the water vapour pressure causes the formation of an acid mist that is difficult to remove. The fortified $H_2SO_4$ that is obtained may then be diluted to the desired strength. In order to meet air pollution requirements, the gas leaving the scrubber must be further treated, which adds another expensive step.

Catalysts other than vanadium pentoxide are capable of oxidizing sulphur dioxide to sulphur trioxide. For example, platinum and other noble metals may be used. While such catalysts do tend to reduce the oxidation temperature, they also tend to be too expensive to be employed in commercial processes.

Activated carbon in the form of powder or pellets has shown activity that is comparable with that of vanadium oxide or platinum as catalyst for sulphur dioxide oxidation either in a "dry" or a "wet" process.

In a dry process, carbon is used to concentrate the $SO_2$ in the gas stream. Temperatures greater than 200° C. must be used to remove sulphuric acid and/or $SO_3$ from the carbon surface. In doing so, the carbon reduces both compounds to $SO_2$ and is oxidized in turn. Thus, carbon is consumed in the dry process. When water is used to remove sulphuric acid and/or $SO_3$ from the carbon surface i.e. a wet process, dilute sulphuric acid is the final product.

An improvement has been achieved by operating the reactor with periodic flushing of the carbon bed with a brief but high flow of water, as disclosed in Canadian Patent No. 1,229,843. Using this technique, the product has a moderate concentration but is still highly corrosive. Thus, the reactors used in the process must be capable of withstanding the effects of such acid e.g. stainless steel reactors must be used.

In an aspect of the present invention, it has now been found that an activated carbon that has been rendered hydrophobic or lyophobic with an appropriate polymer added to the carbon, shows an enhanced activity if the catalyst is flushed with water, sulphuric acid, an inert organic solvent, with a reactive organic compound or with a supercritical fluid that optionally contains inert organic solvent or reactive organic compound. In other aspects of the present invention, the catalyst may be used in a packed bed or supported on corrugated metallic or plastic screens or plates which make up structural packings with straight parallel channels or open cross-flow channels. In the latter cases, the hydrophobic or lyophobic polymer can serve as a binder to fix the fine powdered carbon on the support surface or may itself be the support medium.

In other aspects, it has been found that, if the oxidation is carried out with no water in the feed, the sulphur trioxide that is formed can be removed with a reactive organic substrate capable of forming organic acid sulphate or organic sulphonate compounds. If the oxidation is undertaken in the presence of a small excess of water, based on the stoichiometric amount required, highly concentrated sulphuric acid solutions can be obtained by flushing the catalyst with appropriate organic solvents. These solvents can contain some water. Thus, it has now been found that organic solvents and other organic compounds may be used in the stripping of the sulphur trioxide and sulphuric acid from the catalyst, and the resultant product is less corrosive to the materials used in the fabrication of the apparatus of the process.

Accordingly, one aspect of the present invention provides a process for the recovery of sulphur trioxide, solutions of sulphuric acid, or organic derivatives thereof, using organic compounds, comprising the steps of:

(a) passing a mixture of $SO_2$ and an oxygen-containing gas over an activated carbon catalyst at a temperature of at least 15° C.;

(b) stripping the activated carbon of (a) with either (i) a liquid organic compound selected from the group consisting of ketones, ethers, decalin, tetrahydrofurans, sulpholanes, glymes and formamides and which is non-reactive with sulphur trioxide or sulphuric acid, or (ii) a liquid organic compound capable of forming organic sulphates or sulphonates by reaction with sulphur trioxide or sulphuric acid, and (c) recovering the products so obtained.

In a preferred embodiment of the present invention, the product is recovered by separating the non-reactive liquid organic compound of (i) or unreacted liquid organic compound of (ii) by flashing or multistage distillation.

In embodiments of the present invention, the organic compounds wet the activated carbon, preferably being imbibed into pores in the activated carbon, which is preferably in a packed bed or structured packing.

In further embodiments, the reactive organic liquid capable of forming organic sulphates or sulphonates is selected from the group of alkyl-aromatic compounds e.g. dodecylbenzene, dodecyinaphthalene or any linear or branched alkylbenzene with a chain length of 12 to 18 carbon atoms; phenols; fatty alcohols e.g. linear alcohols with a carbon chain of 12 to 18 carbon atoms; long chain olefins; and any other organic compound capable of forming organic sulphate or sulphonate compounds by reaction with sulphur trioxide or sulphuric acid.

In yet another embodiment, the product obtained is highly concentrated sulphuric acid.

In a still further embodiment, the product obtained is an organic sulphate or sulphonate.

In other embodiments, the sulphur trioxide is obtained by oxidation of sulphur dioxide, the sulphur dioxide being obtained by burning of sulphur, from flue gas or from an industrial or natural waste stream.

In a preferred embodiment, step (a) is carried out in an atmosphere of a compound or element selected from the group consisting of carbon dioxide, ethane, propane, nitrous oxide, xenon, trifluoromethane, low molecular weight fluorocarbon and fluoroethane under near critical or supercritical conditions, especially in which step (a) is additionally carried out in the presence of a modifier compound selected from the group consisting of ketones, ethers, decalin, tetrahydrofurans, sulpholanes, glymes and formamides.

Figure 2:
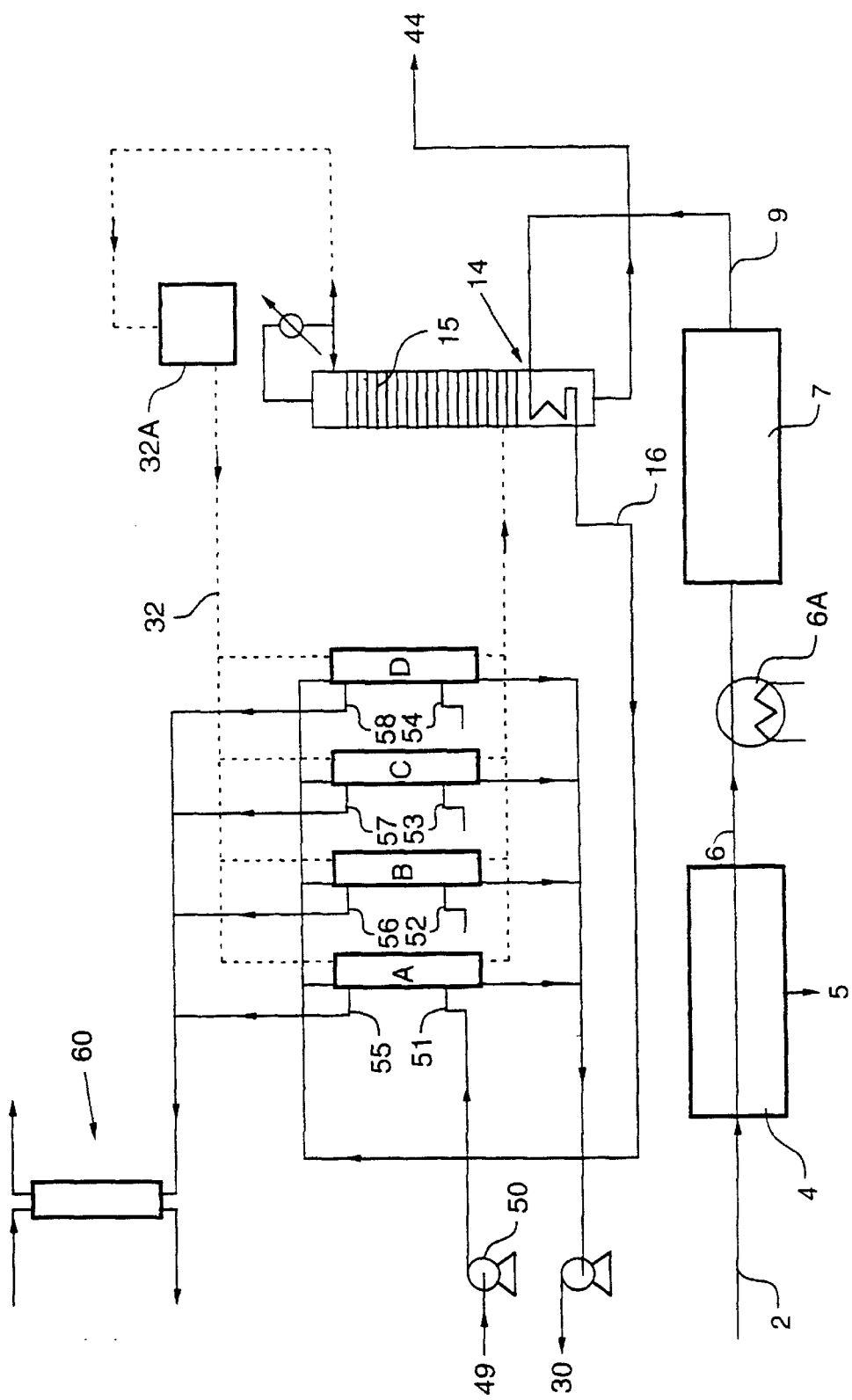

The present invention is illustrated by the embodiment shown in the drawing, in which:

FIG. 1 is a schematic representation of apparatus for oxidation of sulphur dioxide in gas containing sulphur dioxide and recovery of concentrated sulphuric acid; and FIG. 2 is a schematic representation of a further embodiment of the apparatus.

The process of the present invention is directed to the recovery of sulphuric acid, or reaction products thereof, in which sulphur trioxide therefore has been obtained by the oxidation of sulphur dioxide. In particular, sulphur trioxide is recovered in the form of concentrated sulphuric acid or organic sulphate or sulphonate compounds.

In the process, carbon in the form of granules, fibres or extruded sheets, or bound to a structure and having $SO_2$ and/or sulphuric acid absorbed thereon, is scrubbed with an organic liquid to remove sulphuric acid from the carbon. An embodiment of a process is illustrated in FIG. 1 which shows an apparatus, generally indicated by 1, of an embodiment of a process of the present invention. The apparatus is intended for use with flue gas, or smelter off-gases, but could readily be adapted, if necessary, for use with any other suitable gas containing $SO_2$ and $O_2$.

Apparatus 1 has flue gas inlet 2 to blower 3, which is optional, which feeds a gas cyclone or electrostatic filter 4. Cyclone 4 has dust discharge outlet 5 and clean gas outlet 6. Clean gas outlet 6 is connected to bag filters 7 and 8. Filter 8 is connected, through pipe 9, to heat exchanger 10. Heat exchanger 10 has water inlet 11 and steam outlet 12. Heat exchanger 10 is, in turn, connected through pipe 13 to reboiler 14 in a distillation column 15. Distillation column 15 could be in the form of a flash drum, in which case reboiler 14 would be a heat exchanger in pipe 43. Pipe 16 passes from the outlet of reboiler 14 to reactor inlets 17, 18, 19 and 20 of reactors (or reboilers) A, B, C and D, identified by 21, 22, and 24. Each of reactors A, B, C and D are connected through reactor gas outlets 25, 26, 27 and 28 to condenser 29. Condenser 29 has gas outlet 30 and solvent outlet 31. Gas outlet 30 leads to a solvent recovery plant e.g. an absorber and stripper or a carbon-bed absorber.

Solvent inlet 32 connects to pump 33 and solvent recycle pipe 48 in the solvent recycle system. Outlet pipe 34 of pump 33 connects pump 33 to reactor solvent inlets 35, 36, 37 and 38 to reactors A, B, C and D. Reactor solvent outlets 39, 40, 41 and 42 are connected through pipe 43 to distillation column of flash drum 15. Distillation column or flash drum 15 has acid outlet 44 in the bottom thereof and vapour outlet 45 in the top. Distillation column or flash drum overhead 45 is connected to condenser 46, with recycle inlet 47 to distillation column or flash drum 15 and through recycle pipe 48 to pump 33. It is understood that if a flash drum was used, recycle inlet 47 would not be required.

In operation, flue gas is fed through flue gas inlet 2 and cleaned in gas cyclone or electrostatic filter 4 and dust filters 7 and 8. The flue gas would normally contain sulphur dioxide, oxygen, nitrogen, water vapour, particulate matter, and may also contain other gases. The flue gas passing from dust filter 8 is fed through pipe 9 to heat exchanger 10. Heat exchanger 10 cools the flue gas, using water through water inlet 11 that is discharged from the heat exchanger through steam outlet 12. The cooled flue gas is passed through pipe 13 to reboiler 14 located at the bottom of distillation column 15 or to a heat exchanger in pipe 43 if a flash drum is used. The flue gas passing through reboiler 14 is at a temperature high enough to flash off solvent in distillation column or flash drum 15, as discussed below. The cooled and cleaned flue gas is fed to reactors A, B, C and D.

Gas passing from reactors A, B, C and D is optionally fed through reactor gas outlets 25, 26, 27 and 28 to condenser 29 or sent directly a to solvent recovery unit (not shown). The gaseous component is discharged through gas outlet 30 of condenser 29, if used. Solvent and other liquids entrained in the gaseous component passing from reactors A, B, C and D pass through solvent outlet 31. Solvent pass through solvent outlet 31 would normally be recycled e.g. to solvent inlet 32.

The solvent fed to the reactors is primarily recycled solvent passing from distillation column or flash drum 15 through pipe 48 to pump 33. Additional (make up) solvent is added through solvent inlet 32 as required. Solvent is passed from pump 33 through pipe 34 to reactor solvent inlets 35, 36, 37 and 38 of reactors A, B, C and D. Solvent passes through reactors A, B, C and D co-current with the flue gas in the embodiment illustrated in FIG. 1. The solvent extracts sulphuric acid from the activated carbon catalyst in reactors A, B, C and D. A solution of solvent and sulphuric acid passes from reactors A, B, C and D to reactor solvent outlets 39, 40, 41 and 42 and is fed into the distillation column or flash drum 15 through pipe 43. Solvent is flashed from the solution fed to the distillation column or flash drum using the heat supplied in reboiler 14. The non-volatile component i.e. sulphuric acid is discharged through acid outlet 44.

In preferred embodiments of the operation of the process, the sulphuric acid content is 92–100%. Lower concentrations of sulphuric acid could be obtained by increasing the water vapour content in the gas in line 2, by adding water to the recycle line 48. Solvent flashed or distilled in distillation column 15 passes through the recycle system via pipe 48 to pump 33.

In one embodiment of the operation of the process of the invention illustrated in FIG. 1, solvent is fed continuously through reactors A, B, C and D, and fed to the distillation column. In this embodiment, only one reactor may be required. However, such operation should only be used with solvents having a low vapour pressure and/or at moderate gas flow rates. In case of high solvent volatility, such operation may lead to loss of solvent.

In another embodiment, a second heat exchanger could be located after exchanger 10 of FIG. 1, to reduce the water vapour content in the gas flowing to reactors A, B, C and D. Excess water would lead to dilution of the acid in line 44. In the second heat exchanger, the gas is cooled and fed to a water-cooled condenser and a knock-out drum for removal of water vapour. The cooled gas leaving the knock-out drum is recycled to the second heat exchanger to cool in-coming gas and be re-heated.

In yet another embodiment, intermittent operation of the process is used. In this embodiment, gases are passed, alternatively, through each of the reactors A, B, C and D in turn, starting with A, without solvent, until sulphur dioxide breakthrough occurs. Then the gas flow stream is switched to the next reactor, B, and solvent is flushed through reactor A, in order to extract sulphuric acid from the carbon bed. The number of reactors required is determined by the gas flow rates, sulphur dioxide concentration in the gaseous stream, activity and amount of activated carbon in the catalyst in each reactor.

A further embodiment of intermittent operation is shown in part in FIG. 2. In order to reduce the load on the solvent recovery unit, an air or inert gas stream is used to strip solvent from the carbon bed in reactors A, B, C, and D. This air or inert gas stream could be heated to further reduce the volume of gas needed for stripping. As described previously, $SO_2$-containing gas enters at inlet 2, passes filter 4 and waste heat boiler 6A before passing bag filter 7 and being fed to reboiler 14 as before. The stripping gas 49 enters a blower 50 and then it is distributed to reactors A, B, C, and D through lines 51, 52, 53, and 54. Stripping gas leaving the reactors in lines 55, 56, 57 and 58, flow to a solvent recovery plant, represented by 60. As described above, the solvent recovery plant could consist of an absorber and stripping unit or a bed of activated carbon serving as an absorber. In this embodiment, the condenser unit 29 (in FIG. 1) would not be necessary and there would be no solvent line 31. Gas leaving the condenser, 30, would be discharged to the surroundings. Solvent captured in the recovery plant could be returned to the process through storage 32A and line 32.

In one embodiment of the invention, the organic liquid is selected from liquids that would normally not react with the sulphur trioxide to form derivative products thereof under the conditions, especially temperature, used in the process. Examples of such organic liquids include ketones, ethers, decalin (decahydronaphthalene), tetrahydrofurans, N-methyl pyrrolidone, sulpholane, ethylene carbonate, propylene carbonate, tetramethyl urea, glymes viz. dimethyl ethers of the ethylene glycol family, diglyme triglyme, tetraglyme e.g. diethylene glycol diethyl ether and diethylene glycol di-n-butyl ether, dimethyl formamide, monomethyl formamide and formamide. Examples of ketones are acetone, methyl ethyl ketone and diethyl ketone. Examples of ethers include ethyl ether, also known as diethyl ether. The organic liquid is selected such that $SO_3$ or sulphuric acid is at least partially soluble.

In other embodiments of the invention, the activated carbon containing $SO_3$ is scrubbed with organic liquids that are capable of reacting with sulphur trioxide. Preferably, such organic compounds react with sulphur trioxide under the conditions of the operation of the scrubbing process for removal of the sulphur trioxide. Examples of such reactive organic compounds are alkyl aromatic compounds, fatty alcohols, phenols, long chain olefins, and other organic compounds capable of forming organic sulphate or sulphonate compounds. Examples of fatty alcohols include primary alcohols with 8–20 carbon atoms, especially straight chain primary alcohols. Examples of such alcohols include octyl alcohol, decyl alcohol, lauryl alcohol, myristyl alcohol, cetyl alcohol and stearyl alcohol. Other fatty alcohols are unsaturated alcohols e.g. oleyl alcohol, linoleyl alcohol and linolenyl alcohol. Examples of linear alkyl aromatic compounds are toluene, ethyl benzene, or the like but especially linear or branched alkyl aromatic compounds with 12 to 18 carbon atoms e.g. dodecyl benzene or dodecyl naphthalene. In this embodiment, the product is a reaction product, not sulphuric acid.

The process of the present invention is preferably operated at temperatures in the range of 15–150° C. In preferred embodiments, the temperature is in the range of 15–80° C. The process may be operated over a range of pressures e.g. from about one atmosphere up to about 200 atmospheres. In addition, the process may be operated with gas hourly space velocities in the range of from 300 to about 120000 $h^{-1}$. It is to be understood that solvent flow rates can vary over a wide range. In a continuous mode of operation, the flow rate is proportional to the rate of production of sulphuric acid on the carbon surface, whereas in an intermittent mode of operation, the number of reactors needed is inversely proportional to the solvent flow rate.

The process of the present invention may be operated with a continuous flow of liquid organic compound, with a co-current flow or counter-current flow of liquid and gases. As discussed herein, the process may also be operated using an appropriate number of packed reactors. In the latter, the gaseous stream will flow through the first reactor for a period of time determined by the gaseous stream flow rate, its concentration of sulphur dioxide, and catalyst mass and activity, until there is sulphur dioxide breakthrough in the reactor, the so-called "active period". The gaseous stream is then switched to the second reactor. Meanwhile, the first reactor is flushed with a non-reactive solvent to remove sulphuric acid, to regenerate the reactor and recover product, the so-called "regenerative period". The number of reactors is determined by the ratio between active and regenerative periods.

The process may be operated for solvent recovery by distillation, in the case of non-reactive solvents. Alternative methods may be used for recovery of product, for example, using neutralization to obtain surfactants.

The process may utilize flashing of solvents from sulphuric acid in a flash drum. However, if the solvents are less volatile and not conducive to flashing or if a simple flash does not provide adequate solvent removal, a distillation column may be utilized with heat being supplied to the column. Heat of separation (distillation) is preferably supplied by the hot flue or other industrial gases; hot steam or a fired boiler may also be used to supply heat.

If the organic solvent fed to the reactors is capable of reacting with sulphur trioxide or sulphuric acid under the conditions of operation of the process, then the product of the reaction could pass directly from pipe 43 through outlet 44, and product purification would take place downstream using known processes.

The present invention provides an improved method of scrubbing sulphur trioxide from a gas stream, either to produce sulphuric acid or to directly produce reaction products e.g. certain organic compounds. The process is less corrosive on the materials used to fabricate the apparatus of the process.

As disclosed above, another aspect of the present invention relates to the preparation of the catalyst for the conversion of sulphur dioxide to sulphur trioxide, sulphuric acid or their derivatives with organic substrates, and to the use of that catalyst. The preferred catalyst is based on an activated carbon e.g. Centaur™ activated carbon from Calgon Carbon Ltd., which may be promoted with inorganic or organic compounds as enhancers of its catalytic activity. Examples of such enhancers are metallic porphyrines, phthalocyanines, cesium oxide and promoted cesium oxide, manganeous oxide, and are typically used in an amount that does not exceed 0.3 wt. % of the carbon amount. The catalytic powder, dried by heating at an appropriate temperature e.g. between 120 and 500° C., and degassed in vacuum e.g. 5 to 10 hours at 1 to 10 kPa, is rendered hydrophobic or lyophobic by treatment with alcohols having carbon chain lengths greater than $C_4$, oxidized oligomers of polyethylenes of high or low densities, or oxidized oligomers of polypropylenes. Typically 0.1–0.5 wt. % of material is used for such hydrophobic treatment. In one embodiment, the partially hydrophobic powder is then incorporated in melted fluorinated polymers in an amount of 10–40 wt. %. It is then preferably extruded as monoliths with parallel channels, or as open cross-flow-channel packings or is mold-injected as corrugated sheets. The shape, size, and angle of channels should be correlated with the flow rates of both gases and liquids and the rheological properties of solvents and products.

In a preferred embodiment of the invention, the catalyst used in the process, as described above, is in the form of a catalyst on a substrate assembly in which the substrate assembly comprises a plurality of corrugated sheets in a spaced apart relationship. The sheets may also be fabricated from carbon fibre, by extrusion or injection moulding e.g. of powder. Each of the sheets is angled downwards at an angle of between about 30° and 60°. The corrugated sheets may be perforated along the channels of the corrugations. Alternatively, the sheets could be a mesh of an appropriate mesh size. In embodiments, the corrugated sheets are assembled in packages. Each sheet, or each package of sheets, is rotated axially with respect to the adjacent sheet or packages of sheets at an angle of 45–135°, and preferably at an angle of 80–100°. Each of the sheets has a coating of activated carbon admixed with a hydrophobic polymer, as described above.

The spacing between the sheets, the angles at which the sheets are deployed with respect to each other, the number and size of any openings along the channels, all have an effect on the space velocity of gas passing through the catalyst, and maybe adjusted to obtain predetermined space velocities. It is understood that the catalyst on the substrate assembly would be positioned within a suitable vessel for carrying out the oxidation of sulphur dioxide and flushing the activated carbon with organic compounds as disclosed herein. The process of the invention may also be carried out using a structured packing coated with activated carbon.

In another aspect, it has been found that, if the oxidation is carried out in a near-critical or supercritical fluid (above critical temperature and pressure), sulphur trioxide formed is more readily recovered from the catalyst pores as either free sulphur trioxide, sulphuric acid, or an organic sulphate or sulphonate. Since oxidation of sulphur dioxide is a reversible reaction with volume contraction, an increase in pressure will shift the equilibrium towards the formation of sulphur trioxide.

Such supercritical fluids may be selected from a group of compounds having low to medium critical temperatures, especially compounds selected from the group consisting of carbon dioxide, ethane, propane, nitrous oxide, xenon, fluorophorm (trifluoromethane), low molecular weight fluorocarbons, or fluoroethers. A further enhancement of the scrubbing effect may be achieved if a modifier is added to these supercritical fluids. The modifier may be selected from a group consisting of ketones, ethers, decalin, tetrahydrofurans, sulpholanes, glymes, and formamides, especially in a concentration of 5–20 vol. % vs. supercritical fluid.

The temperature of the process using supercritical fluids is in the range of 15–80° C., pressures in the range of from about 60 to about 200 atmospheres, and space velocities in the range of from 300 to about 120000 $h^{-1}$.

The process is operated for solvent(s) recovery by using a high-pressure liquid-liquid separator. The effluent from the reactor is expanded across a pressure-reduction valve. The supercritical fluid and the modifier, in a liquid form, are then pumped and recycled to the reactor.

The present invention provides an improved method for the manufacture of sulphuric acid or surfactants. Aspects of the invention offer the advantages of low reaction temperatures which lead to higher conversions and low energy consumption, catalyst productivities that tend to be higher by 20–30 fold compared with the preferred commercial catalysts for sulphur dioxide oxidation, lower cost catalysts, relatively low pressure drops over the catalyst bed even at high flow rates, a broad range of sulphur dioxide concentrations which allows the use of the system with any source of sulphur dioxide, good temperature control due to the high radial mass and heat transfer coefficients, long lifetime of the catalyst, a catalyst that is easily handled even in high volumes, no or minimal disposal problems of the exhausted catalyst, and a process that tends to be less corrosive on the materials used to fabricate the apparatus of the process.

The present invention is illustrated by the following examples:

EXAMPLE I

Three experiments were performed in a 5 cm (I.D.)×100 cm reactor using a 30-cm deep bed of a wire mesh coil coated with Centaur™ activated carbon (60 US mesh) that has been fixed onto the wire mesh with a polyfluorocarbon resin. Other than the structured packing, the laboratory-scale trickle bed reactor was of conventional design with a distributor for the liquid phase, a support screen for the coil packing, and a separation zone in the bottom of the bed. Liquid and gas flows were co-current downward.

In the first experiment, the laboratory-scale trickle-bed scrubber was continuously flushed with acetone at a flow rate of 0.435 mL/s. In the second experiment, the scrubber was flushed with water at a flow rate of 1.54 mL/s. Inlet gas in both experiments contained 0.75% $SO_2$, 5% $O_2$, and 2.9% $H_2O$ with the balance $N_2$, on a volume % basis. Feed and bed temperature were maintained at a temperature of about 23° C. Only $O_2$ and $N_2$ entered the reactor for the first 12 minutes on stream. $SO_2$ concentration detected in the reactor outlet was 100 ppmv i.e. ppm by volume, from the residual $SO_2$ absorbed in the system.

After 140 minutes on stream with the feed containing 0.75% $SO_2$ and $O_2$ and $N_2$, steady state was reached with the off-gas from the scrubber containing about 1050 ppmv $SO_2$. $SO_2$ removal was 86% when acetone was used for flushing. Acid strength in the scrubbing fluid was 0.33 N. Dissolved $SO_2$ and $H_2SO_3$ in the scrubbing fluid were negligible.

The concentration of acid in the scrubbing fluid is consistent with the composition of the inlet gas. Per second of operation, the inlet contained 0.0532 mmol $SO_2$ and 0.206 mmol water. If all the moles of water were scrubbed out by acetone, the normality of the solution should have been 0.032. Thus, water was incompletely removed in the scrubber. The sulphur balance showed 1.84 mmol $SO_2$ went in and 2.20 mmol $SO_2$ left as $SO_2$ or $H_2SO_2$.

With water as the flushing fluid, the $SO_2$ in the off-gas from the scrubber reached about 3350 ppmv after 60 minutes and appeared to have come to steady state. $SO_2$ removal was 61.5% and the outlet $H_2SO_4$ concentration was 0.026 N. The flush contained dissolved $SO_2/H_2SO_3$ at a concentration of about 0.02 N. The sulphur balance showed 0.519 mmol in and 0.535 mmol out.

The influence of the $SO_2$ mol percent in the inlet gas and the solvent flow rate were examined in a third experiment. In this experiment, the inlet $SO_2$ concentration was 2.0 vol. % instead of 0.75 vol. %. A continuous acetone scrubbing fluid at a flow rate of 1.11 mL/s was employed. The initial reading with only $N_2$ and $O_2$ passing through the experimental unit was 60 ppmv. $SO_2$ was added to the gas stream after 6 min and the flow of acetone began at the same time. About 140 minutes were needed for steady state. At this time, $SO_2$ in the off-gas was about 690 ppmv. $SO_2$ removal when steady state was attained reached 96.5%. Acid concentration was about 0.4 N assuming that 25% of the liquid sample was acetone.

The low concentration is explained by the water vapour in the entering synthetic stack gas: 0.000142 mol/s $SO_2$ along with 0.000206 mol/s $H_2O$. If all of the water is captured, the normality of the resulting acid would be 0.189 N. It was concluded that not all of the water is scrubbed from the gas phase. The $SO_2$ balance was good viz. 3.194 mmol entered the scrubber while 3.139 mmol left as $SO_2$ or $H_2SO_4$. Only a negligible amount of $SO_2$ or $H_2SO_3$ was found in the acetone wash. If the acetone flow rate had not been increased by a 2.5-fold factor, raising the $SO_2$ by the same factor would have greatly increased the $SO_2$ in the off-gas from the scrubber and reduced the percent removal.

EXAMPLE II

The procedure in Example I was repeated, except that lauryl alcohol was used in place of acetone. Some $SO_2$ was observed in the effluent, but the removal of $SO_2$ was estimated to be over 90%.

The product obtained was not sulphuric acid, but rather a mixture containing both lauryl alcohol and the sulphate thereof. Thus, lauryl sulphate was formed from the alcohol in the reactor. Concentration of lauryl sulphate and the alcohol conversion were not measured in the experiment.

EXAMPLE III

Experiments on the use of supercritical fluids were carried out on a laboratory scale using a catalyst similar to that of Example I, in a tubular flanged reactor. The tubular flanged reactor was equipped with a rupture disk, check valves, a pressure relief valve, filter, and it was lined with Teflon™ fluoropolymer.

A synthetic gas containing 5 vol. % $SO_2$, 5 vol. % $H_2O$ and 3 vol. % $O_2$ vs. the total feed volume, was compressed and fed into a mixing chamber where it was combined with two other separate streams viz. carbon dioxide and acetone; the amount of acetone was 10 vol. % and the remainder was $CO_2$. The oxidation was carried out at 35° C. and at 77 atmospheres, with a space velocity of 1000 $h^{-1}$.

The effluent from the reactor was depressurized to 50 atmosphere across a pressure-reduction valve and was separated in a high-pressure separator. Sulfuric acid (99 wt. %) was continuous discharged at the bottom of the separator. Liquid carbon dioxide and acetone were pumped back to the reactor.

Product was recovered from the catalyst as described herein.

What is claimed is:

1. A process for the recovery of sulphur trioxide, solutions of sulphuric acid, or organic derivatives thereof, using organic compounds, comprising the steps of:

(a) passing a mixture of $SO_2$ and an oxygen-containing gas over an activated carbon catalyst at a temperature of at least 15° C.;

(b) stripping the activated carbon of (a) with either (i) a liquid organic compound selected from the group consisting of ketones, ethers, decalin, tetrahydrofurans, sulpholanes, glymes and formamides and which is non-reactive with sulphur trioxide or sulphuric acid, or (ii) a liquid organic compound capable of forming organic sulphates or sulphonates by reaction with sulphur trioxide or sulphuric acid; and (c) recovering the products so obtained.

2. The process of claim 1 in which the product is recovered by driving off the non-reactive liquid organic compound of (i) or unreacted liquid organic compound of (ii) by flashing or multistage distillation.

3. The process of claim 2 in which the organic compounds wet the activated carbon.

4. The process of claim 3, in which the liquid is a reactive organic liquid capable of forming organic sulphates or sulphonates and is selected from the group consisting of alkyl aromatic compounds, phenols and fatty alcohols.

5. The process of claim 4 in which the reactive organic liquid is alkyl-aromatic compound selected from the group consisting of dodecylbenzene, dodecylnaphthalene or any linear or branched alkylbenzene with a chain length of 12 to 18 carbon atoms or a fatty alcohol selected from the group consisting of linear alcohols with a carbon chain of 12 to 18 carbon atoms.

6. The process of claim 3, in which the product obtained is concentrated sulphuric acid or an organic sulphate or sulphonate.

7. The process of claim 6 in which, in step (b), the activated carbon is stripped with a liquid organic compound selected from the group consisting of ketones, ethers, decalin, tetrahydrofurans, sulpholanes, glymes and formamides and which is non-reactive with sulphur trioxide or sulphuric acid.

8. The process of claim 6 in which, in step (b), the activated carbon is stripped with a liquid organic compound capable of forming organic sulphates or sulphonates by reaction with sulphur trioxide or sulphuric acid.

9. The process of claim 8 in which the process is operated with intermittent stripping of the carbon bed, said process using multiple carbon beds with beds being subjected to step (a) in sequence so that the process operates with a continuous flow of gas through the process, each bed being separately subjected to step (b) subsequent to being subjected to step (a).

10. The process of claim 3 in which sulphur dioxide is oxidized to sulphur trioxide using a partially hydrophobic or lyophobic activated carbon catalyst.

11. The process of claim 10 in which the partially hydrophobic or lyophobic activated carbon catalyst is in a fluorinated polymer.

12. The process of claim 3 in which the activated carbon catalyst is a promoted carbon catalyst.

13. The process of claim 3 in which all beds of carbon are subjected to step (a) and subsequently all beds are subjected to step (b).

14. The process of claim 3, in which step (a) is carried out in an atmosphere selected from the group consisting of carbon dioxide, ethane, propane, nitrous oxide, xenon, trifluoromethane, and fluoroethane.

15. The process of claim 14 in which step (a) is carried out in the presence of a modifier compound selected from the group consisting of ketones, ethers, decalin, tetrahydrofurans, sulpholanes, glymes and formamides.

16. A catalyst on a substrate assembly, said substrate assembly comprising a plurality of corrugated sheets in a spaced apart relationship, each sheet being angled downwards at an angle of between about 30–60° and further each sheet is rotated axially with respect to an adjacent sheet at an angle of about 45–135°, said sheet having a coating thereon of a catalyst for oxidation of sulphur dioxide to sulphur trioxide, said catalyst comprising a hydrophobic activated carbon.

17. The catalyst of claim 16 in which the activated carbon or promoted activated carbon is mixed with an alcohol having a chain length of greater than four carbon atoms or with oxidized oligomers of polyethylene or polypropylene to form the partially hydrophobic or lyophobic activated carbon catalyst.

18. The catalyst of claim 16 in which corrugated sheets are perforated.

19. The catalyst of claim 18 in which the corrugated sheets are mesh.

20. The catalyst of claim 18 in which the sheets are fabricated from carbon fiber activated for oxidation of $SO_2$ and rendered partially hydrophobic or lyophobic.

21. The catalyst of claim 16 in which the catalyst is in the form of a coated coil packing.

22. The catalyst of claim 16, in which said activated carbon is rendering hydrophobic by being admixed with a polymer.

23. The catalyst of claim 16, in which said activated carbon is promoted with an enhancer.

* * * * *

UNITED STATES PATENT AND TRADEMARK OFFICE
CERTIFICATE OF CORRECTION

PATENT NO.    : 6,521,200 B1
DATED         : February 18, 2003
INVENTOR(S)   : Silveston et al.

It is certified that error appears in the above-identified patent and that said Letters Patent is hereby corrected as shown below:

Column 3,
Line 58, after "22," insert therefor -- 23 --

Column 4,
Line 24, after "directly" delete "a"
Line 28, after "solvent" ($2^{nd}$ occurrence) delete "pass" and insert therefor -- passing --

Column 5,
Line 32, after "condenser," delete "30" and insert therefor -- 29 --

Column 7,
Line 1, before "oxide" delete "mangeneous" and insert therefor -- manganous --
Line 40, after "and" delete "maybe" and insert therefor -- may be --

Column 8,
Line 64, after "or" delete "$H_2SO_2$" and insert therefor -- $H_2SO_4$ --

Column 9,
Line 59, after "was" delete "continuous" and insert therefor -- continuously --

Signed and Sealed this

Eighth Day of June, 2004

JON W. DUDAS
*Acting Director of the United States Patent and Trademark Office*